United States Patent [19]
Chen et al.

[11] Patent Number: 5,667,348
[45] Date of Patent: Sep. 16, 1997

[54] SCREW FOR FIBROUS BOARDS

[76] Inventors: Sen-Yang Chen; Chao-Tai Cheng, both of No. 155, Hui-Min Rd., Nan-Tzu Dist., Kaohsiung City, Taiwan

[21] Appl. No.: 649,078

[22] Filed: May 16, 1996

[51] Int. Cl.[6] .............................. F16B 25/00; F16B 35/04
[52] U.S. Cl. ........................................ 411/420; 411/418
[58] Field of Search ................................ 411/386, 418, 411/420, 421, 411

[56] References Cited

U.S. PATENT DOCUMENTS

| | | | |
|---|---|---|---|
| 324,487 | 8/1885 | Rice | 411/421 X |
| 1,235,626 | 8/1917 | Woodward | 411/421 |
| 1,288,893 | 12/1918 | Holmes | 411/421 |
| 3,192,819 | 7/1965 | Hanneman | 411/418 |
| 3,507,183 | 4/1970 | Thurston . | |
| 3,739,682 | 6/1973 | Siebol et al. . | |
| 5,120,172 | 6/1992 | Wakai . | |
| 5,171,186 | 12/1992 | Lukes . | |

FOREIGN PATENT DOCUMENTS

| | | | |
|---|---|---|---|
| 475368 | 7/1951 | Canada | 411/421 |
| 2549147 | 5/1977 | Germany . | |
| 925135 | 5/1963 | United Kingdom | 411/421 |

*Primary Examiner*—Neill R. Wilson
*Attorney, Agent, or Firm*—Limbach & Limbach L.L.P.

[57] ABSTRACT

The shank portion of a screw, which is free of a drill bit portion and which is adapted for use with a fibrous board, has a surface that is formed with a screw thread throughout the length of the shank portion, and a lower section that is formed with a flute at the surface thereof. The flute extends from a tip of the shank portion and has a longitudinal length which is inclined with respect to a longitudinal axis of the shank portion.

3 Claims, 3 Drawing Sheets

SCREW FOR FIBROUS BOARDS

GROUND OF THE INVENTION

1. Field of the Invention

The invention relates to a screw, more particularly to a screw which can be quickly driven into a fibrous board, such as a wooden or composite board, at a smaller driving force requirement.

2. Description of the Related Art

Screws are used to fasten two workpieces or to regulate the distance between two workpieces. Although all screws have the aforementioned functions, different types of screws exist due to differences in the materials of the workpieces. For example, U.S. Pat. Nos. 3,507,183, 3,739,682, 5,120,172 and 5,171,186 disclose conventional self-drilling screws with drill bit portions. If the self-drilling screw is applied to a fibrous board, such as a wooden or composite board, the drill bit portion damages the fibrous board such that a relatively weak binding force is present between the fibrous board and the threaded shank portion of the screw. Thus, the aforementioned self-drilling screws are only ideal for application in metal workpieces.

FIGS. 1 and 2 illustrate a conventional screw 1 that is adapted for use with a fibrous board 2. Prior to application of the screw 1, which is free of a drill bit portion, to the fibrous board 2, a small hole 21 is initially cut into the fibrous board 2. The screw 1 is then rotated so as to be driven into the fibrous board 2 at the hole 21.

When driving the screw 1, the resulting shavings must be discharged to prevent blocking of the screw thread 12 at the surface of the shank portion 11 of the screw 1 and to prevent disruption of the threaded engagement between the screw 1 and the fibrous board 2. To achieve this goal, the surface of the lower section of the shank portion 11 of the screw 1 is formed with a flute 15 which extends from a flat tip of the shank portion 11 and which has a longitudinal length parallel to a longitudinal axis 14 of the shank portion 11. The flute 15 is defined by a side wall 151 parallel to the longitudinal axis 14, and a curved bottom 152.

Some of the drawbacks of the conventional screw 1 are as follows:

1. The conventional screw 1 cannot be quickly driven into the fibrous board 2. As shown in FIG. 2, the screw thread portions on the surface of the side wall 151 of the flute 15 are arranged along a straight line parallel to the longitudinal axis 14 and contact the fibrous board 2 at the same time, thereby resulting in a relatively large resistance between the shank portion 11 and the fibrous board 2. This large resistance retards the driving speed of the screw 1 and results in a larger driving force requirement and in a longer driving time.

2. As mentioned beforehand, the conventional screw 1 has a larger driving force requirement. Thus, when the conventional screw 1 is driven with the use of a mechanical driving tool (not shown), this large driving force requirement easily uses up the reserve power of a pressure source of the driving tool. Thus, the pressure source must be frequently replenished when driving the screw 1, thereby inconveniencing the operator.

3. In view of the large driving force requirement of the conventional screw 1, the application of an extremely large driving force usually occurs. This may lead to damage to the screw thread 12 on the screw 1 which, in turn, may adversely affect the binding force between the fibrous board 2 and the screw 1.

SUMMARY OF THE INVENTION

Therefore, the object of the present invention is to provide a screw which can be quickly driven into a fibrous board, such as a wooden or composite board, at a smaller driving force requirement.

According to the present invention, a screw, which is free of a drill bit portion and which is adapted for use with a fibrous board, comprises a shank portion having a surface that is formed with a screw thread throughout the length thereof, and a lower section that is formed with a flute at the surface of the shank portion. The flute extends from a tip of the shank portion and has a longitudinal length which is inclined with respect to a longitudinal axis of the shank portion. The flute is defined by a side wall, which is inclined relative to the longitudinal axis, and a curved bottom such that screw thread portions on the surface of the side wall of the flute are disposed in a staggered arrangement. Preferably, the flute has a depth which decreases gradually from the tip of the shank portion and has a maximum depth equal to radius of the shank portion. The longitudinal length of the flute forms an angle of less than 45° with the longitudinal axis. In one embodiment, the tip of the shank portion is flat. In another embodiment, the tip of the shank portion tapers gradually.

BRIEF DESCRIPTION OF THE DRAWINGS

Other features and advantages of the present invention will become apparent in the following detailed description of the preferred embodiments with reference to the accompanying drawings, of which.

DESCRIPTION OF THE PREFERRED EMBODIMENTS

Figure 3:
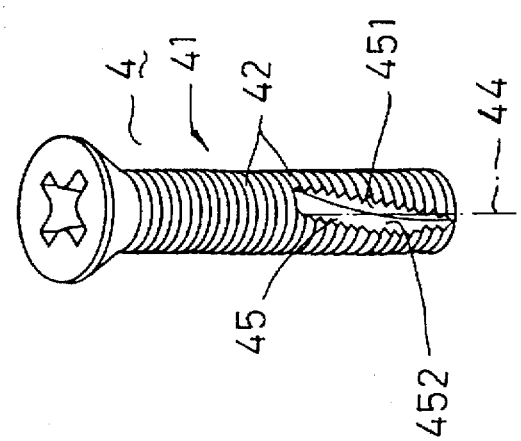
FIG. 3 is a perspective view of the first preferred embodiment of a screw according to the present invention.

FIG. 3 illustrates the first preferred embodiment of a screw 4 according to the present invention. The screw 4 is free of a drill bit portion and is adapted for use with a fibrous board, such as a wooden or composite board. The screw 4 has a shank portion 41 with a surface that is formed with a screw thread 42 throughout the length of the shank portion 41. The shank portion 41 further has a lower section formed with a flute 45 at the surface thereof. The flute 45 extends from a tip of the shank portion 41 and permits the discharge of shavings which result when the screw 4 is driven into a fibrous board so as to prevent blocking of the screw thread 42 on the shank portion 41 and so as to prevent disruption of the threaded engagement between the screw 4 and the fibrous board. The flute 45 has a longitudinal length which is inclined with respect to a longitudinal axis 44 of the shank portion 41, and is defined by a side wall 451 which is inclined relative to the longitudinal axis 44, and a curved bottom 452. Thus, the screw thread portions on the surface of the side wall 451 of the flute 45 are disposed in a staggered arrangement. Preferably, the depth of the flute 45 decreases gradually from the tip of the shank portion 41. In this embodiment, the flute 45 has a maximum depth equal to radius of the shank portion 41. In addition, the longitudinal length of the flute 45 forms an angle of less than 45° with the longitudinal axis 44. The size of this angle depends upon the intended application of the screw 4 and preferably ranges from 12° to 32.5°.

Figure 2:
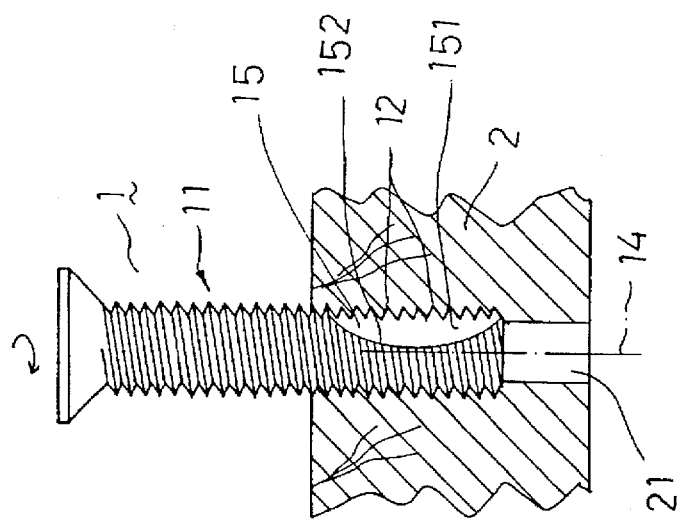
FIG. 2 is a schematic view which illustrates the conventional screw when being driven into a fibrous board.
Figure 1:
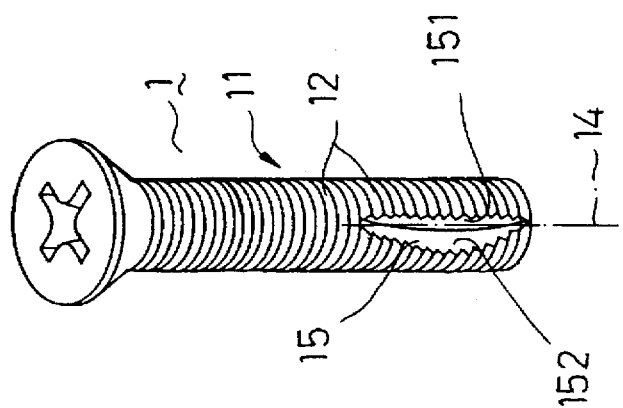
FIG. 1 is a perspective view of a conventional screw that is adapted for use with a fibrous board.
Figure 4:
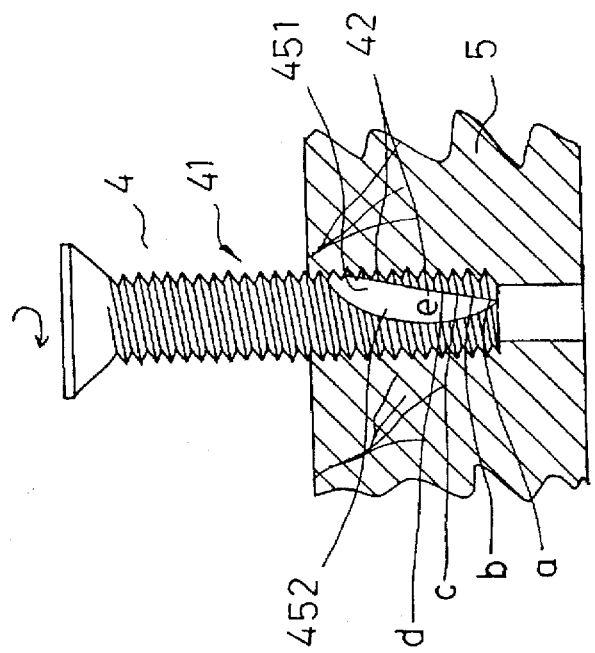
FIG. 4 is a schematic view which illustrates the first preferred embodiment when being driven into a fibrous board.

FIG. 4 illustrates the screw 4 when being driven into a fibrous board 5 at a small hole 51 in the latter. As shown, when the screw 4 is rotated, the screw thread portions (a), (b), (c), (d), (e) on the surface of the side wall 451 of the flute 45 contact the fibrous board 5 in sequence. The gradual contact between the screw thread portions (a), (b), (c), (d), (e) and the fibrous board 5 results in a smaller resistance between the shank portion 41 and the fibrous board 5, thereby resulting in a smaller driving force requirement and in a shorter driving time. Thus, the screw 4 can be quickly driven into the fibrous board 5 and is not easily damaged during the driving operation.

An experiment was conducted to verify the improved effects of the screw 4 over the conventional screw 1 described beforehand. A number of the screws 4, 1 were driven into a wooden board that is 40 mm thick under an axial load of 25 kg. at a speed of 2500 RPM. The results indicate that it takes an average of 0.96 and 1.15 seconds, respectively, to drive the screw 4 and the conventional screw 1 into the wooden board. These results verify that the screw 4 can be quickly driven into the wooden board without causing damage to the screw 4. In addition, since the screw 4 can be driven into the wooden board within a shorter amount of time as compared to the conventional screw 1, one can conclude that a smaller resistance is encountered by the screw 4 and that a smaller driving force is required by the same.

Figure 5:
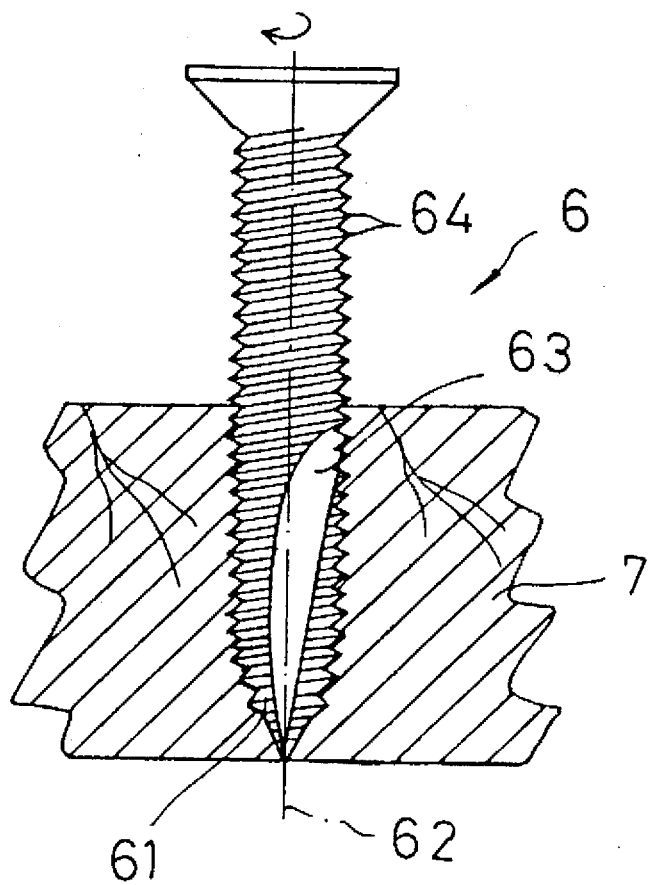
FIG. 5 is a schematic view which illustrates the second preferred embodiment of a screw according to the present invention when being driven into a fibrous board.

FIG. 5 illustrates the second preferred embodiment of a screw 6 according to the present invention when being driven into a fibrous board 7. The screw 6 is generally similar to the screw 4 of the previous embodiment, the main difference residing in that the shank portion 61 of the screw 6 has a gradually tapering tip, whereas the shank portion 41 of the screw 4 has a flat tip. As with the previous embodiment, the shank portion 61 has a surface that is formed with a screw thread 64 and a flute 63 which extends from the tip of the shank portion 61 and which has a longitudinal length that is inclined with respect to a longitudinal axis 62 of the shank portion 61. The operation of the second preferred embodiment is generally similar to that of the previous embodiment and will not be detailed further.

The advantages and characterizing features of the screws 4, 6 of the present invention are as follows: 1. The screw of the present invention can be quickly driven into a fibrous board. Since the screw thread portions on the surface of the side wall of the flute are disposed in a staggered arrangement, simultaneous contact of the same with the fibrous board can be avoided, thereby resulting in a smaller resistance between the shank portion of the screw and the fibrous board which, in turn, results in a faster driving speed, a smaller driving force requirement and in a shorter driving time.

2. Since the screw of this invention has a smaller driving force requirement, when the screw is driven with the use of a mechanical driving tool, the reserve power of a pressure source of the driving tool is not easily used up. This results in added convenience to the operator.

3. In view of the smaller driving force requirement of the screw, the application of large driving forces is not needed, thereby avoiding damage to the screw thread on the screw which, in turn, ensures that an effective binding force is present between the fibrous board and the screw.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A screw free of a drill bit portion and adapted for use with a fibrous board, comprising a shank portion which has a surface that is formed with a screw thread throughout the length of said shank portion, and which has a lower section formed with a flute at said surface of said shank portion, said flute extending from a tip of said shank portion and having a longitudinal length which is inclined with respect to a longitudinal axis of said shank portion, said flute being defined by a planar side wall which is inclined relative to said longitudinal axis, and a curved bottom, said planar side wall having a surface with screw thread portions that are disposed in a staggered arrangement in a direction receding from a direction of screw advancing rotation, said flute having a depth which decreases gradually from said tip of said shank portion, said flute having a maximum depth equal to radius of said shank portion, the longitudinal length of said flute forming an angle ranging from 12° to 32.5° with said longitudinal axis.

2. The screw as claimed in claim 1, wherein said tip of said shank portion is flat.

3. The screw as claimed in claim 1, wherein said tip of said shank portion tapers gradually.

* * * * *